UNITED STATES PATENT OFFICE.

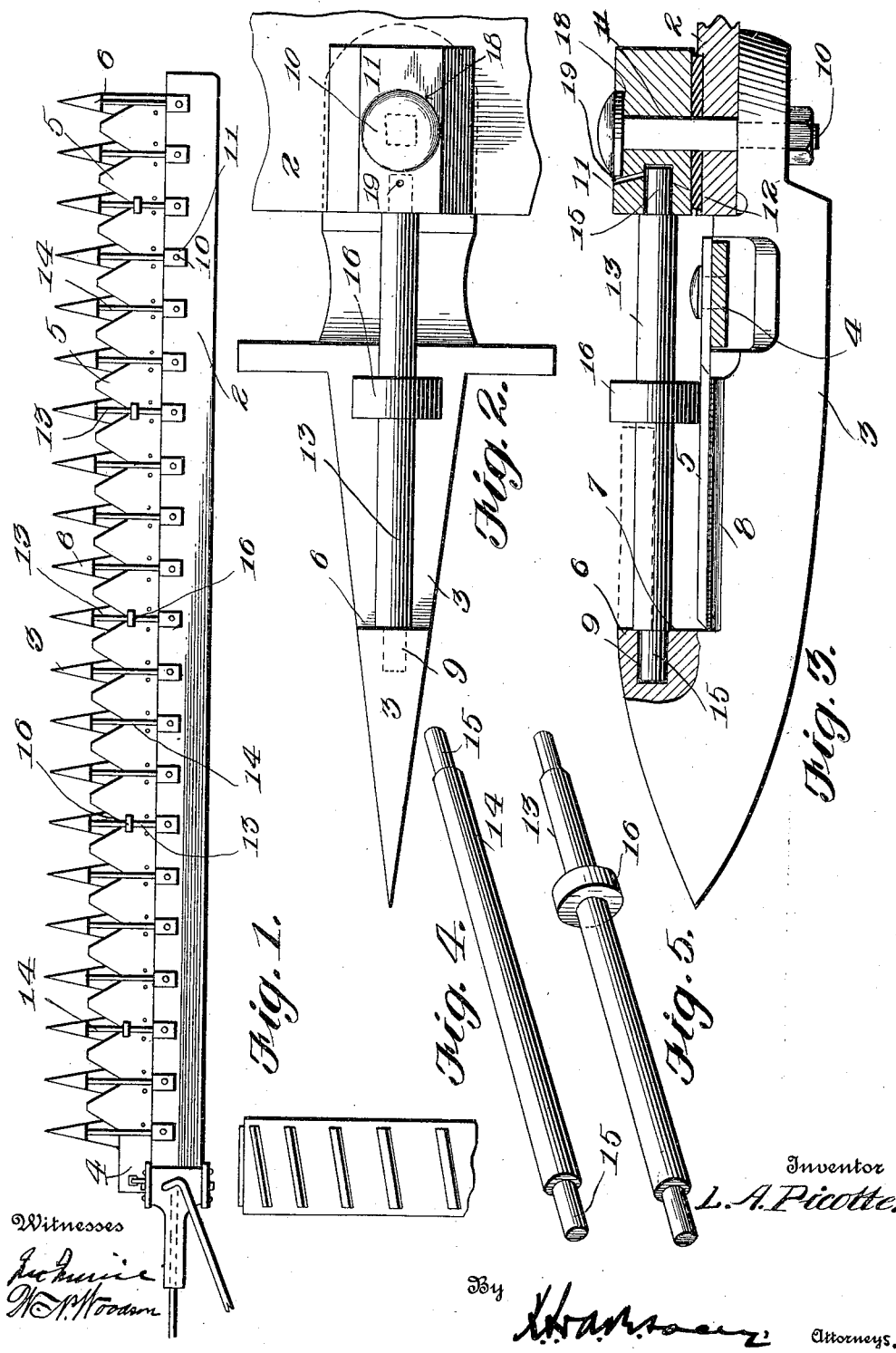

LLOYD A. PICOTTE, OF LOS ANGELES, CALIFORNIA, ASSIGNOR OF ONE-HALF TO I. J. MUMA, OF LOS ANGELES, CALIFORNIA.

GUARD-FINGER FOR MOWING AND REAPING MACHINES.

1,130,330.  Specification of Letters Patent.  Patented Mar. 2, 1915.

Application filed November 3, 1913. Serial No. 798,970.

*To all whom it may concern:*

Be it known that I, LLOYD A. PICOTTE, citizen of the United States, residing at Los Angeles, in the county of Los Angeles and State of California, have invented certain new and useful Improvements in Guard-Fingers for Mowing and Reaping Machines, of which the following is a specification.

My invention relates to mowing machines, and particularly to means for holding the knives into proper engagement with the upper faces of the guard fingers.

In mowing machines at present in use in cutting green crops, such as clover, alfalfa, etc., the juices forced out from the bruised stems of the plants collect between the upper and lower parts of the guard fingers. In other words, dirt, dust and mashed-up stems become coagulated by these juices in the slot through which the cutters operate until the fingers become tightly packed with dirt and vegetable refuse, greatly impeding the reciprocation of the cutters, with the result that friction is greatly increased and draft is relatively heavy. In mowing machines at present in use there are also provided a plurality of clips mounted upon the finger bar and pressing upon the cutter bar or the upper faces of the cutters and acting to hold the cutters down on the cutting edge of the ledger plate. These clips act to collect vegetable matter and refuse and to impede the reciprocation of the cutters and furthermore, when an old cutter bar is to be taken out and a new cutter with resharpened knives is to be put in, the end of the cutter bar strikes these stationary fingers and this necessitates that the operator shall depress the end of the cutter bar with one hand and pull the cutter bar with the other, often a very annoying process, and one that consumes time. Very often a cutter bar having knives that are gummed up can be taken out only after scraping the gum off and digging out all the gum and dirt that has collected in the fingers.

One of the objects of my invention is to materially reduce the draft on harvesting machinery of the mowing machine type by reducing friction, this being accomplished by the provision of means which will act to hold the knives down on the ledger plates without causing the collection of dust, dirt, and mashed-up vegetable material in the fingers, and obviate the use of clips with their attendant friction.

A further object of the invention is to so construct the finger bar and fingers that the use of clips for holding the cutters down upon the ledger plates may be entirely eliminated, thus obviating the objections heretofore stated.

A further object of the invention is to provide in connection with the guard fingers of a mowing or reaping machine, anti-friction rollers acting to hold the cutters down on the ledger plate and to provide means whereby the rollers may be readily lubricated, and further means whereby the rollers may be readily adjusted.

Other objects will appear in the course of the following description.

My invention is illustrated in the accompanying drawings, wherein:—

Figure 1 is a plan view of the finger bar and fingers of the mowing machine with my improved antifriction rollers in place thereon, the cut also showing the cutter bar and knives. Fig. 2 is a plan view of the finger bar and one of the fingers with my improvement applied thereto. Fig. 3 is a side elevation of the construction shown in Fig. 2, the finger bar and cutter bar being in section. Fig. 4 is a perspective view of one of the plain rollers, and Fig. 5 is a perspective view of one of the rollers designed to engage at all times with the knives.

Corresponding and like parts are referred to in the following description and indicated in all the views of the accompanying drawings by the same reference characters.

Referring to these drawings, 2 designates the usual finger bar of a mowing machine or reaping machine, and 3 designates the fingers mounted on and extending out therefrom. These fingers are of the usual or ordinary construction, except that the fingers are not horizontally slotted for the passage of the cutter knives as in the form illustrated in dotted lines in Fig. 3. Reciprocating across these fingers is the usual cutter bar 4 having mounted thereon the cutters or knives 5 of any usual or ordinary shape.

The upper face of each finger bar is cut away or so formed as to leave the upwardly projecting shoulder 6 extending upward above the upper face of the cutter knives and the lower face 7 of this shoulder extends vertically downward to the face of the ledger plate 8. This inner face 7 of the shoulder 6 is formed with the bearing socket 9.

Passing through the rear end of each finger and through the cutter bar 2 is a bolt 10, the uper end of which passes through a bearing block 11 which is formed in its forward end face with a recess or socket 12 which is approximately in line with the bearing socket or recess 9. Disposed between and supported in these bearings 9 and 12 are the rollers 13 and 14. The roller 14 has a uniform diameter from end to end except that its extremities are reduced as at 15 to engage in the bearings 9 and 12. The roller 13 is formed intermediate its ends with the annular flange 16 which is of such diameter that when the roller 13 is in position, the periphery of the flange 16 will bear upon the upper faces of the knives as illustrated clearly in Fig. 3.

While I do not wish to limit myself to the particular construction of the block 11, illustrated in the drawings, I preferably form this block with a square aperture. Passing vertically therethrough is the bolt 10, this bolt being for a portion of its length square in cross section as at 17. The upper face of the block 11 surrounding the square aperture is countersunk as at 18 and the head of the bolt fits into this countersink. A duct 19 extends from the face of the block 11 to the extremity of the bearing recess 12 whereby to lubricate this recess. Preferably the upper face of the cutter bar 2 is countersunk so that the block 11 will fit snugly in the countersink and thus the block 11 will be held from any lateral movement. The block 11 is vertically adjustable by the use of washers disposed between the under face of the block and the upper face of the cutter bar. It will also be understood that the sockets or recesses 9 and 12 are of such diameter that the reduced extremities of the rollers 13 and 14 fit loosely in these sockets or recesses, that is, just loose enough to allow a slight up and down adjustment by washers under block 11, this adjustment being necessary to give the correct contact or pressure on the cutting knives by the flange of the roller. Theoretically the axis of the rollers should be parallel to the plane of the ledger plates.

As seen in Fig. 1 the great majority of the rollers are of the type shown in Fig. 4. At predetermined intervals, however, the rollers shown in Fig. 5 will be used, the object being to have only as many of the flanged rollers 13 as are necessary to hold the knives or cutters down against the ledger plates. In other words only just so many of the rollers 13 are used as are necessary to take the place of the clips which it is proposed to eliminate. The plain rollers 14 revolve only when dirt and stems collect beneath them. The flanged rollers, of course, rotate with every reciprocation of the cutter bar. The extremities of these rollers are reduced in diameter in order to reduce friction in the bearings. These rollers will probably be made of Bessemer steel rod with case hardened reduced extremities.

It will be noticed in Fig. 3 that the portion $x$ shown in dotted lines would extend parallel to the finger but spaced from the ledger plates. This is the ordinary construction on all mowing machines and this rearward extension of the upper portion of the finger indicated by the letter $x$ is absolutely necessary for the proper operation of the mechanism. The function of this rearwardly extending portion or lip shown in dotted lines and designated $x$, in the ordinary mower is to hold the grass upright so that the knives may strike squarely against the stems of the grass. If this portion $x$ were removed the tendency of the grass would be to bend in the direction of the blow from the knives making it much more difficult to cut the stems because when the grass bends over the knives strike it at an acute angle instead of at a right angle. If a knife strikes grass that is bent over in the direction in which the knife is traveling, the tendency is for the knife to rise up or ride over stems instead of cutting them squarely. It will thus be seen that it is absolutely necessary to have some kind of a support for the grass stems. As before stated all mowers today have this rearward extension which is spaced from the ledger plates, and it is in the space between this extension $x$ and the ledger plates that grass and other vegetable matter becomes mashed and packed. The rearwardly extending lip $x$ becomes gummed from the juices of the green grass and gradually this becomes caked up from collected dirt and mashed up stems until finally the knife bar passes back and forth with great difficulty on account of the pressure of the knives. This greatly increases the draft or pull of the team and it is obvious that any pressure on the knife bar will make a great difference in the draft. This is illustrated by the fact that it is perfectly possible for an operator to exert a sufficient pressure with his thumbs on the knife bar that the traction wheels of the mower will be absolutely locked. Machines often become so clogged up that after stopping to turn a corner the traction wheels will lock and it is necessary to back up and secure suitable impetus so that the quick jerk incident thereto will start the knives. It is in order to obviate these objections that I provide the roller 14.

This roller takes the place of the rearward extension x. It acts precisely like the rearward extension x to support the grass blades against the action of the knives. The roller does not ordinarily revolve except when something accumulates beneath it: that is, between it and the knife bar. Instead of a broad lip or rearward extension x ¾ inch wide, allowing accumulations between it and the knife bar, I have provided the roller 14 which performs exactly the same function as far as holding the grass upright but offers no chance for accumulations beneath it. As soon as anything gets wedged in under the roller the roller turns over and the obstruction very readily passes out.

Only enough of the rollers 13 are used to hold the knife bar tight against the cutting edges of the guard. If all of the rollers were of the form of roller 13 it would unnecessarily increase friction. Rollers 14 and 13 are interchangeable so that roller 14 can be exchanged for roller 13 when the guards have become worn from use.

The advantages of my invention lie in the fact that it is impossible for the knives and knife bar to become gummed up and clogged where these antifriction rollers are used. Furthermore, as before stated, the use of these rollers eliminates the use of the clips, now used to hold the knives down on the cutting edge of the ledger plate. The flanged roller 13 will accomplish the same result without any friction. Furthermore, this means for holding the cutters permits the ready taking out of dull knives and replacing with sharp ones. The whole set of knives comes out readily and the new one may be as readily replaced, the end of the cutter bar and the end knives striking the rollers and rolling in, instead of striking the stationary clips. It is also to be noted that in doing away with the slot x shown in dotted lines in Fig. 3, I eliminate the possibility of clogging up the guard finger by the collection of dirt and vegetable matter in this slot; that is, under the rearwardly projecting portion of the guard finger. Inasmuch as the rollers are constantly and freely rotatable, every reciprocation of the knives will cause a rotation of the rollers which will drive out the dirt and trash.

While I have referred heretofore to this device as being used on mowing machines, I wish it understood that it is of course equally applicable to all forms of reaping machine knives moving in one plane.

Having thus described the invention what is claimed as new is:—

1. In a mower or reaper, the combination with a finger bar having a plurality of fingers mounted thereon and extending therefrom, and a knife bar operating upon the upper faces of the fingers, of rollers mounted above the knife bar and extending longitudinally of each guard finger, each roller being rotatably supported at its forward end in the guard finger and at its rear end being operatively and rotatably supported upon the finger bar, certain of the rollers being of approximately uniform diameter from end to end and certain other rollers being provided with flanges adapted to have rolling contact with a set of cutters.

2. In a mower or reaper, the combination with a finger bar, a guard finger having a vertically extending shoulder at its forward end, a cutter bar and knives operating across the face of the guard fingers, of a roller rotatably mounted upon said shoulder and extending rearwardly entirely across the cutter bar and knives and above and parallel to the cutting plane of said knives and cutter bar.

3. In a mower and reaper, the combination with a finger bar, and a plurality of fingers thereon, of a plurality of rollers one for each guard finger, and a plurality of supporting blocks mounted on the finger bar one at the base of each guard finger, each of said rollers being rotatably supported at its forward end in the forward end of the guard finger and at its rear end in a corresponding block and each roller extending above and parallel to the body of the guard finger.

4. In a mower and reaper, the combination with a finger bar, and a plurality of fingers thereon, of a plurality of rollers one for each guard finger, and a plurality of supporting blocks mounted on the finger bar one at the base of each guard finger, said rollers each being rotatably supported at its forward end in the forward end of the guard finger and at its rear end in a corresponding block, said blocks being adjustable, each roller extending above and parallel to the body portion of its corresponding guard finger.

5. In a mowing and reaping machine, a finger bar, a finger mounted thereon, a supporting block mounted on the guard finger bar at the base of the guard finger and having a bearing recess formed therein, a bolt holding the block to the finger bar, a knife bar and cutting knives operating over the upper face of the guard finger, and a roller having reduced extremities and disposed above the knife bar and knives, the forward extremities of said roller being rotatably mounted in the forward end of the guard finger, the rear extremity of the roller being rotatably mounted in the recess of said block.

6. In a mowing and reaping machine, a finger bar, a guard finger projecting therefrom and having a vertically extending shoulder adjacent its forward end, a supporting block disposed upon the finger bar at the base of the guard finger, a bolt square in cross section for a portion of its length engaging through the block and said finger bar, and a roller rotatably mounted at its forward end in the vertical shoulder of the guard finger and at its rear end rotatably mounted in the said block.

7. In a mowing and reaping machine, the combination with a plurality of guard fingers and knives moving across said fingers, of a plurality of rotatable members extending parallel to said fingers disposed above the knives and extending entirely across the knives.

8. In a mower or reaper, the combination with a finger bar, a plurality of guard fingers carried thereon and cutting knives operating across the guard fingers, of a plurality of rollers each rotatably disposed at one end in a corresponding guard finger and each operatively and rotatably supported at its other end upon the finger bar, said rollers extending entirely across the cutting knives and being disposed above said knives.

In testimony whereof I affix my signature in presence of two witnesses.

LLOYD A. PICOTTE. [L. S.]

Witnesses:
 INEZ THORP,
 E. H. HASTINGS.

Copies of this patent may be obtained for five cents each, by addressing the "Commissioner of Patents, Washington, D. C."